Oct. 12, 1971          J. L. RECTOR                     3,611,491
         APPARATUS FOR VARYING THE WIDTH OF EXTRUDED
Filed July 1, 1969            THERMOPLASTIC MATERIAL
                                                    2 Sheets-Sheet 1
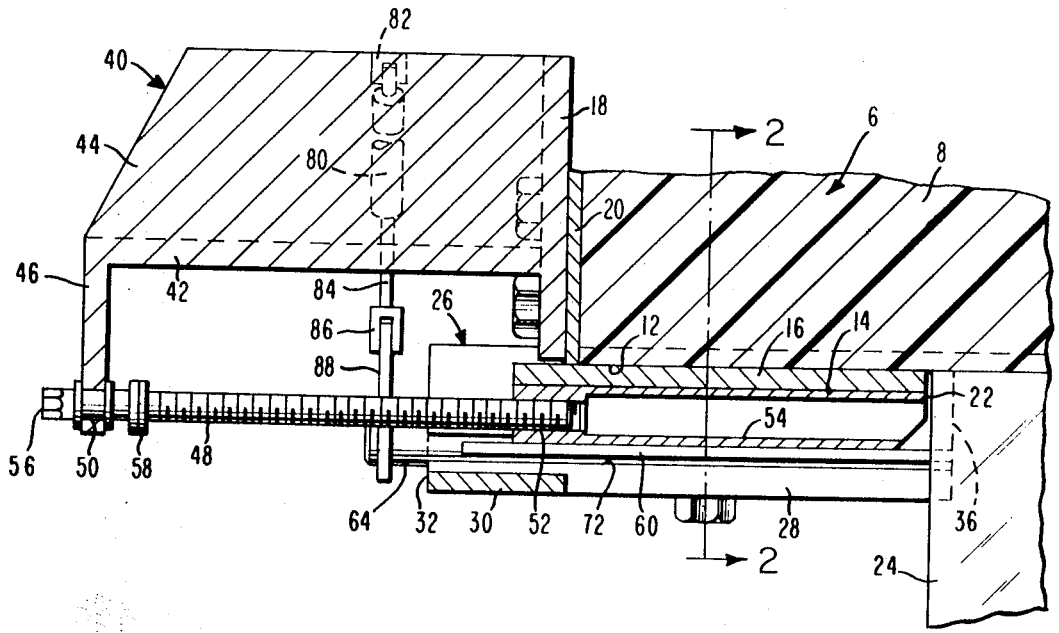
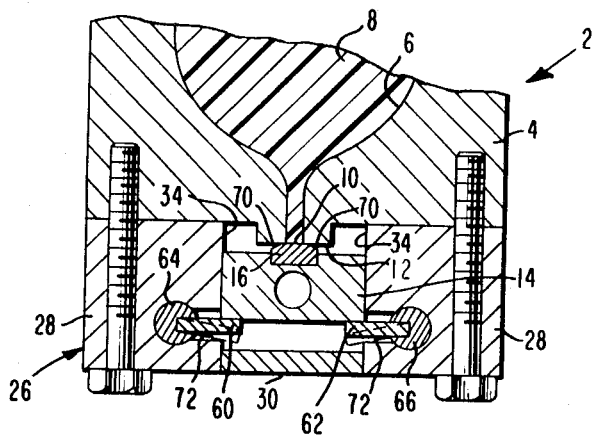
INVENTOR
JAMES LOUIS RECTOR
BY
ATTORNEY Oct. 12, 1971
J. L. RECTOR
3,611,491
APPARATUS FOR VARYING THE WIDTH OF EXTRUDED
THERMOPLASTIC MATERIAL
Filed July 1, 1969
2 Sheets-Sheet 2
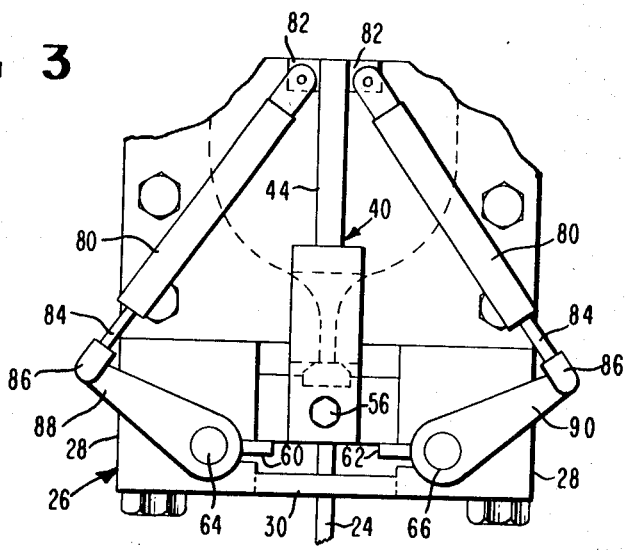
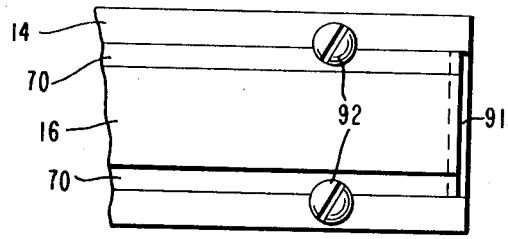
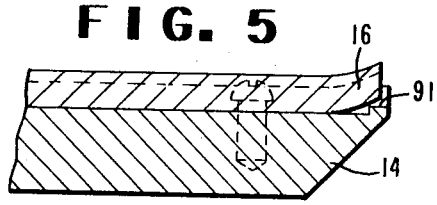
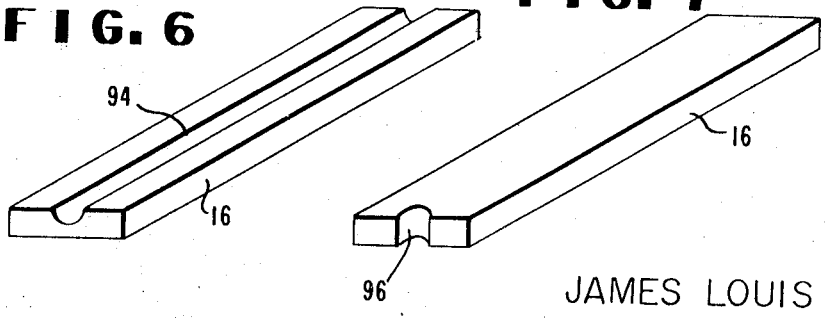
INVENTOR
JAMES LOUIS RECTOR
BY *Edwin Tocker*
ATTORNEY

United States Patent Office 3,611,491
Patented Oct. 12, 1971

3,611,491
APPARATUS FOR VARYING THE WIDTH OF EXTRUDED THERMOPLASTIC MATERIAL
James Louis Rector, Vienna, W. Va., assignor to E. I. du Pont de Nemours and Company, Wilmington, Del.
Filed July 1, 1969, Ser. No. 838,292
Int. Cl. B29f 3/04
U.S. Cl. 18—12 DS                                    10 Claims

ABSTRACT OF THE DISCLOSURE

Means for adjusting the width of sheeting of thermoplastic material extruded from an elongated extrusion orifice of an extrusion die is provided, comprising a slide positioned over a portion of the orifice extending from at least one of its ends and a pair of cams oppositely rotating to urge the slide against the die to block that portion of the orifice from extruding sheet.

---

The present invention relates to extrusion of sheet, and more particularly to apparatus for defining the width of the sheet being extruded.

Various slide mechanisms are described in the literature for adjusting the width of thermoplastic material sheet being extruded from an elongated extrusion orifice, e.g. U.S. Pats. 3,293,689 and 2,859,475. Such literature mechanisms suffer from the disadvantages of requiring loosening and tightening of a multiplicity of bolts between adjustments of the slide and of resulting in a varying sealing pressure along the length of the slide and poor control of sealing pressure.

The present invention provides a much quicker acting apparatus for relocating a slide along an elongated extrusion orifice and for providing a uniform and controllable sealing pressure along the slide length. More specifically, the present invention provides an extrusion die having a die face and an elongated extrusion orifice in the die face for extruding thermoplastic material in the form of a sheet, the sheet width adjustment apparatus comprising closure means for a portion of the orifice extending from at least one end of the orifice slidably mounted along the die face and means rotating about an axis which extends in the direction of elongation of the orifice for urging the closure means into sealing relationship with the die face upon rotation of the rotating means to block the portion of the orifice coextending with the closure means, thereby defining the width of the sheet extruded from the orifice.

The invention will be described in greater detail hereinafter with reference to the accompanying drawings in which:

FIG. 1 is a side elevation cross-sectional view of a sheet extrusion die incorporating one embodiment of apparatus of the present invention for defining the width of the sheet;

FIG. 2 is a view taken along line 2—2 of FIG. 1;

FIG. 3 is an end view of the die of FIG. 1;

FIG. 4 is an enlarged plan view of the inboard end of the one embodiment of closure means of the present invention;

FIG. 5 is a side elevation in cross section of the embodiment of FIG. 4;

FIG. 6 is a perspective view of an embodiment of sealing strip useful in the present invention; and FIG. 7 is a perspective view of another embodiment of sealing strip useful in the present invention.

With reference to the drawings, FIG. 2 shows an extrusion die 2 consisting of a die block 4 containing a cavity 6 which is supplied with thermoplastic material 8 in extrudable form from a source such as an extruder (not shown). The cavity 6 narrows into an elongated extrusion orifice 10 (width of orifice shown in FIG. 2) in the face 12 of the die block 4.

Closure means are provided to block a portion of the orifice extending from at least one end of the orifice, the closure means in the embodiment shown in the drawings comprising a slide 14 arranged to slide along the die face along the length of the orifice and a sealing strip 16 positioned within a groove along the length of the slide and bridging that portion of the orifice 10 running coextensive with the strip as best shown in FIGS. 1 and 2.

As shown in FIG. 1, an end of the die block 4, and thereby an endwall of the die cavity 6 is formed by an end plate 18 bolted to the die block with a gasket 20 interposed between the plate and the block. Normally, the end plate (and gasket) would define the width of sheeting extruded from the orifice, except that according to the present invention the closure means blocks a portion of the extrusion orifice from the end plate 18 to the inboard end 22 of the slide 14 and sealing strip 16, and the inboard end 22 then defines one edge of sheet 24 extruded from the extrusion orifice 10.

This blocking effect is obtained by locating the closure means as desired along the die face 12 and establishing a sealing relationship between the die face and the sealing strip 16.

Location of the closure means is accomplished by a support block 26 bolted to the die block 4 and consisting of a rail portion 28, extending along each side of the orifice 10 connected together by a web 30 at the outboard end 32 of the block 26 only. The inner surface 34 of each rail portion forms a slidable guide surface for the longitudinal sides of the slide 14 to align the sealing strip over the extrusion orifice 10. The outboard end 32 of the support block 26 extends far enough outboard of the extrusion orifice 10 to enable the slide 14 to be completely retracted from the path of the extruded sheet, if desired, so that the end plate 18 would form the edge of the sheet. The inboard end 36 of the support block extends at least as far inboard as the inboard end 22 of the closure means may be positioned for blocking the extrusion orifice.

Sliding of the slide 14 along the guide surfaces 34 can be obtained manually, but is preferably obtained mechanically so as to facilitate sliding of the slide in either direction along the slide path established by the guide surfaces and precise positioning. One embodiment for mechanically causing movement of slide 14, as best shown in FIG. 1 comprises a bracket 40 welded to end plate 18 and consisting of a base portion 42, an upstanding web portion 44, and a leg portion 46 depending from the extremity of the base portion. A lead screw 48 is provided having one end journalled to rotate but not move longitudinally within a hole 50 in leg portion 46 of the bracket and its opposite end threaded and in threaded engagement with a tapped hole 52 in the outboard end of slide 14. The remaining length of the slide is drilled out to form a hole 54 of greater diameter than the lead screw. The journalled end of the lead screw is provided with a hexagonally formed head 56 for gripping by a wrench for rotation of the lead screw, which causes the slide to advance or retract into the path of the extruded sheet, depending on the direction of rotation of the lead screw. For centering purposes, the lead screw 48 can be disjointed and connected together by a flexible coupling 58. The drilled out inboard end of slide 14 provides a sharp break between sheet 24 and the material in the cavity yet to be extruded and this end is chamfered rearwardly as shown in FIG. 2 so that the bottom edge of the slide 14 is out of contact with the sheet 24.

The sealing relationship between closure means and extrusion orifice is obtained by the clamping action of a pair of plates 60 and 62 each engaging the undersurface of the slide 14 and urging the slide towards the die face 12. The plates 60 and 62 are mounted, by welding, in grooves of a pair of rods 64 and 66 rotatably mounted in corresponding grooves in the guide rails 28 extending in the direction of the extrusion orifice as best shown in FIG. 2. As shown in FIG. 1, the plates and rods (only plate 60 and rod 64 shown) extend from the inboard end 36 of the support block 26 almost to the outboard end 32 of the support block so to be available for uniform longitudinal urging of the slide 14 towards the die face 12 regardless of location of the slide 14 therealong.

The urging of the plates 60 and 62 against the slide 14 obtains the sealing relationship by the upper surface of the slide mating with the die face to seal the extrusion orifice or, in the embodiment depicted in the drawings herein, by the sealing strip 16 in the upper surface of the slide being forced against the die face to seal the extrusion orifice. The sealing material is preferably made of a high temperature resistant material which is somewhat more deformable than the metal used to make the slide 14, the deformability aspect of the sealing strip insuring a better seal. Examples of material suitable for use as the sealing strip are polytetrafluoroethylene, asbestos-based gasket sheeting, or copper metal. The sealing pressure between the contacting die face and sealing strip surfaces can be increased by decreasing their area of mutual contact by forming the sealing strip 16 with bevelled surfaces 70 running from an area of mutual contact on each side of the extrusion orifice to the sides of the sealing strip, as best shown in FIG. 2.

The urging action of plates 60 and 62 against slide 14 is obtained by rotating rods 64 and 66 in the counterclockwise and clockwise directions, respectively, and maintaining the rods in the rotative positions corresponding to the sealing pressure desired between the die face and the closure means. A longitudinal passage 72 is present in each rail portion 28 of the support block, the passages 72 communicating between the grooves in which rods 64 and 66 rotate and the guide surfaces 34 along the length of the plates 60 and 62 to provide clearance for limited pivoting of the plates, and thereby limited rotation of the rods 64 and 66 to obtaining the urging action upon the slide 14 as hereinbefore described. The rods 64 and 66 can be rotated in the opposite direction, whereupon the plates 60 and 62 move to the positions shown in phantom lines in FIG. 2, to release the sealing relationship between the die face and the closure means. The extremities of plates 60 and 62 need only move about ¼ inch to disengage the sealing strip from the die face. In translating the rotary rotation of the rods and plates to linear motion of the slide 14, the rods and their respective plates act as cams, with the upper surface of plates 60 and 62 acting as the working surfaces of the cams. Obviously, the cams and their manner of engagement with the slide can take many different forms.

It is apparent that the rotation and counter-rotation of rods 64 and 66 previously described herein can be obtained in many ways. An embodiment of means for rotating the rods is shown in FIGS. 1 and 3, wherein there is shown a pair of fluid power cylinders 80 each journalled to a clevis block 82 mounted on opposite sides of web portion 44 of the bracket 40. The piston 84 of each cylinder is rotatably mounted through another clevis block 86 to crank arms 88 and 90 which are fixedly mounted, such as by welding, at their opposite ends to rods 64 and 66, respectively. The cylinders are supplied from a common source (not shown) of fluid, such as air or oil, under pressure so that the pistons 84 of each cylinder coact simultaneously. Extension of the pistons from the cylinders 80 cause the crank arms 88 and 90 to rotate the rods 64 and 66 counterclockwise and clockwise, respectively, to urge the closure means into sealing relationship with the die face, and retraction of the pistons into the cylinders 80 rotates the rods in the opposite direction, releasing this sealing relationship. The pressure of the fluid acting on the cylinders 80 can be controlled by a pressure regulator (not shown) to apply and maintain the desired force of the plates 60 and 62 urging the closure means towards the die face. Pressure gauges (not shown) for indicating the pressure within the die cavity 6 and of the fluid acting on cylinders 80 can be provided to facilitate adjustment of the latter to provide a sealing pressure greater than, but not excessively greater than, the extrusion pressure employed.

In operation, while sheet 24 is extruded from the extrusion orifice, the force on the closure means exerted by plates 60 and 62 is reduced to a level close to the extrusion force against the closure means exerted by the thermoplastic material in die cavity 6 by reducing fluid pressure to cylinders 80, thereby maintaining a sealing relationship during subsequent movement of the slide to a new location by rotating lead screw 48 via wrenching of its head 56. In other words, the sealing strip does not have to be disengaged from the die face for relocation of the slide. Pressure to the cylinders is then increased to urge the closure into resumption of a tighter sealing relationship with the inboard end 22 defining the new edge of the sheeting.

The same slide apparatus can be present at the opposite end of the extrusion orifice or an end plate 18 and gasket 20 need only be present thereat. In any event, definition of the edges of sheet 24 by at least one such slide apparatus determines the width of the sheet. It will be noted that the support 26, plates 60 and 62 and rods 64 and 66 and the means for rotating the rods, are clear of the path of sheet 24 even when slide 14 is in a retracted position.

FIGS. 4 and 5 show an alternative arrangement of sealing strip 16 and slide 14 at the inboard end of each, wherein because of the relative deformability of the sealing strip and its resultant tendency to flow over the end of the slide, the sealing strip terminates slightly, e.g. about 1/16 inch, short of the end of the slide. This arrangement is useful when the extruded sheet 24 is drawn down sufficiently that the edge of the sheet formed by the inboard end of the sealing strip misses, i.e. is out of contact with, the inboard end of the slide. It is desirable that the outboard end of the sealing strip forms the edge of the sheeting rather than the outboard end of the slide, in order to avoid buildup of thermoplastic material. Thus, as the degree of draw down of the extruded sheet diminishes, the outboard end of the sealing strip must be closer to the outboard end of the slide and may terminate at the end thereof. Alternatively, the outboard end of the slide can be notched, in effect, to bring the outboard end of the slide closer to the outboard end of the sealing strip so as to maintain maximum support surface beneath the sealing strip; the notch being wide enough for the extruded sheeting to pass through it without touching.

The upper surface of the slide can be provided with an elevated step 91, e.g. about 1/32 inch high, extending the width of the groove in the slide beneath the end of the sealing strip, as best shown in FIG. 5, so as to increase the sealing pressure between it and the die face at this location relative to the remaining length of the sealing strip. The step 91 can also be used where the sealing strip terminates at the inboard end of slide 14 which is the embodiment best shown in FIG. 1.

The sealing strip 16 can be secured to the slide 14, in addition to being contained in the groove therein, by a pair of bolts 92 threaded into slide adjacent its inboard end, with the heads of the bolts clamping the sealing strip in place. Longitudinal securement of the sealing strip at this location only enables the sealing strip to thermally expand, without buckling, towards the outboard end of the slide.

Usually the gasket 20 at each end of the extrusion orifice will form a seal with the closure means, e.g. sealing strip 16 riding thereunder. However, to avoid stagnation of the thermoplastic material at the ends of the extrusion orifice, where necessary, the sealing strip can be modified to permit slight leakage or purging of the material from the end of the extrusion orifice, as shown in FIG. 6. In FIG. 6, the sealing strip 16 is provided with a longitudinal groove 94 which would face and lie beneath the extrusion orifice and channel a small amount of thermoplastic material along the sealing strip and out the outboard end thereof. The groove 94 need not extend the entire length of the sealing strip but, depending on the extent of purging desired, can be provided to extend along only a portion of the length of the sealing strip to its outboard end. The polymer leakage obtained for these embodiments can be caught in a receptacle and kept separate from the apparatus thereby.

In FIG. 7, the sealing strip 16 is provided with a notch 96 of any size and shape desired at its inboard end for forming the configuration desired for the edge of the sheet being extruded such as a bead to aid in subsequent processing of the sheet. The notch 96 is in register with the extrusion orifice and runs in the direction of the extruded sheet. In this embodiment, the slide 14 is correspondingly notched to the extent necessary to keep it out of contact with the extruded sheet.

The apparatus of the present invention can be used in connection with any thermoplastic material which softens and flows sufficiently under heat and pressure to be extruded in sheet form. Generally, the material will be a high molecular weight thermoplastic polymer, e.g. number average molecular weight greater than 10,000, however, thermosetting polymers which have not yet cross-linked can also be processed provided temperature and residence time precautions are taken to prevent cross linking within the die. Examples of suitable polymers include the polyolefins, such as polyethylene or polypropylene; the polyamides, such as 66 nylon, 610 nylon, or 6 nylon, or copolymers thereof; the ionomers, the polyvinyl acetals, such as plasticized polyvinylbutyral; the oxymethylene polymers; polysulfones; polycarbonates; polyesters, such as polyethylene terephthalates; the ethylene-propylene-diene monomer rubbers; the halogenated vinyl polymers, such as the vinyl and vinylidene halides, e.g. chlorides and fluorides, and polymers of a greater degree of halogenation; the styrene polymers such as polystyrene and copolymers with other compounds such as butadiene and acrylonitrile; and the acrylate polymers, such as polymethylmethacrylate.

As many apparently widely different embodiments of this invention may be made without departing from the spirit and scope thereof, it is to be understood that this invention is not limited to the specific embodiments thereof except as defined in the appended claims.

I claim:

1. A sheet extrusion die having a die face and an elongated extrusion orifice therein for extruding thermoplastic material in the form of a sheet, closure means for a portion of said orifice extending from at least one end thereof slidably mounted along said die face, and cam means rotating about an axis extending in the direction of elongation of said orifice for urging said closure means into sealing relationship with said die face upon rotation of said rotating means to block said portion of said orifice, thereby defining the width of said sheet being extruded from said orifice.

2. The sheet extrusion die of claim 1 wherein said closure means includes a sealing strip forming said sealing relationship and a slide for supporting said strip.

3. The sheet extrusion die of claim 2 wherein said sealing strip terminates sufficiently short of the inboard end of said slide so as to avoid deforming over said end by the flow of said thermoplastic material through said orifice.

4. The sheet extrusion die of claim 3 wherein said inboard end of said slide has an elevated step beneath the corresponding end of said sealing strip, whereby the resultant sealing pressure between said die face and said sealing strip is greatest at said end of said sealing strip.

5. The sheet extrusion die of claim 2 including means fastening said sealing strip to said slide adjacent to its inboard end only.

6. The sheet extrusion die of claim 2 wherein the sealing strip has a longitudinal groove therein running for at least a portion of its length to the outboard end of said sealing strip for channeling a small amount of said thermoplastic material out said outboard end to avoid stagnation of the thermoplastic material in the die at the blocked portion of said orifice.

7. The sheet extrusion die of claim 2 wherein said sealing strip has a notch at its outboard end for forming an edge on said sheet corresponding to the shape of said notch.

8. The sheet extrusion die of claim 1 including a bracket mounted to said die at at least one end of said orifice and a lead screw rotatably mounted to said bracket and having its screw portion in threaded engagement with said closure means, whereby upon rotation of said lead screw said closure means slides along said die face.

9. The sheet extrusion die of claim 1 wherein the rotating cam means includes a cam positioned to run along each side of the slide path of said slidably mounted means and out of the way of said sheet being extruded from said orifice, each said cam having its working surface in engagement with said closure means, and means for reversibly rotating each said cam so as to alternately obtain said sealing relationship and release thereof depending on the direction of rotation of each said cam.

10. The sheet extrusion die of claim 3 wherein the rotating cam means includes a pair of fluid cylinders arranged to simultaneously rotate each said cam.

References Cited

UNITED STATES PATENTS 3,112,527    12/1963    Pankratz et al.          18—12
3,238,563    3/1966    Hoffman              18—12

TRAVIS S. McGEHEE, Primary Examiner